United States Patent
Netter et al.

(10) Patent No.: US 9,665,965 B2
(45) Date of Patent: May 30, 2017

(54) VIDEO-ASSOCIATED OBJECTS

(75) Inventors: Izhak Zvi Netter, Givaataim (IL); Tal Chalozin, New York, NY (US); Zack Zigdon, Tel Aviv (IL)

(73) Assignee: INNOVID INC., Tel Aviv (IL)

( * ) Notice: Subject to any disclaimer, the term of this patent is extended or adjusted under 35 U.S.C. 154(b) by 346 days.

(21) Appl. No.: 12/687,137

(22) Filed: Jan. 14, 2010

(65) Prior Publication Data

US 2010/0177122 A1  Jul. 15, 2010

Related U.S. Application Data

(60) Provisional application No. 61/144,477, filed on Jan. 14, 2009.

(51) Int. Cl.
*G06T 13/00* (2011.01)
*G06F 17/30* (2006.01)
*G06Q 30/02* (2012.01)

(52) U.S. Cl.
CPC .......... *G06T 13/00* (2013.01); *G06F 17/3089* (2013.01); *G06F 17/30855* (2013.01); *G06Q 30/02* (2013.01)

(58) Field of Classification Search
None
See application file for complete search history.

(56) References Cited

U.S. PATENT DOCUMENTS

| | | | |
|---|---|---|---|
| 5,708,845 A * | 1/1998 | Wistendahl et al. | 715/202 |
| 6,154,771 A * | 11/2000 | Rangan et al. | 709/217 |
| 6,196,917 B1 * | 3/2001 | Mathias | A63F 13/10 463/2 |
| 7,089,579 B1 * | 8/2006 | Mao et al. | 725/109 |
| 7,158,676 B1 * | 1/2007 | Rainsford | 382/190 |
| 7,330,100 B2 * | 2/2008 | Yu | 340/5.61 |
| 8,381,086 B2 * | 2/2013 | Li et al. | 715/203 |
| 2002/0083469 A1 * | 6/2002 | Jeannin et al. | 725/135 |

(Continued)

FOREIGN PATENT DOCUMENTS

| KR | WO 2008127051 A1 * | 10/2008 | A63F 13/10 |
|---|---|---|---|
| WO | WO0231684 | 4/2002 | |

(Continued)

OTHER PUBLICATIONS

Merging Web Brower and Interactive Video—A Hyper Video System for e-Learning and e-Entertainment; Yi-Chun Liao, Han-Bin Chang, Hui-Huang Hsu, Timothy K. Shih; Multimedia Information Network Lab; Department of Computer Science and Information Engineering; Tamkang University; Taiwan, ROC.

(Continued)

*Primary Examiner* — William Beutel
(74) *Attorney, Agent, or Firm* — Koffsky Schwalb LLC; Mark I. Koffsky

(57) ABSTRACT

A companion object to a media player, such as a video player, is responsive to an event associated with the video player. The event may be associated with the data stream displayed by the video player. The event may be associated with an object displayed by the video player. The companion object is displayed outside the display layout of the video player. The companion object and the video player may be displayed by a web browser in a web page. The companion object and the video player may be executed in a securely separated manner.

15 Claims, 4 Drawing Sheets

(56) References Cited

U.S. PATENT DOCUMENTS

| | | | |
|---|---|---|---|
| 2002/0112249 A1* | 8/2002 | Hendricks | H04H 20/10 725/136 |
| 2002/0161909 A1* | 10/2002 | White | G06F 17/30882 709/231 |
| 2004/0021684 A1* | 2/2004 | Millner | H04N 21/23431 715/719 |
| 2004/0227768 A1 | 11/2004 | Bates et al. | |
| 2005/0046630 A1* | 3/2005 | Jacob | G06T 13/00 345/475 |
| 2005/0097471 A1* | 5/2005 | Faraday et al. | 715/723 |
| 2007/0091095 A1* | 4/2007 | Chen | G06T 13/00 345/474 |
| 2007/0124792 A1* | 5/2007 | Bennett et al. | 725/133 |
| 2007/0250775 A1* | 10/2007 | Marsico et al. | 715/716 |
| 2008/0177630 A1* | 7/2008 | Maghfourian et al. | 705/14 |
| 2009/0058821 A1* | 3/2009 | Chaudhri | G06F 3/04817 345/173 |
| 2009/0064012 A1* | 3/2009 | Tremblay | 715/764 |
| 2009/0327893 A1* | 12/2009 | Terry | G06F 3/1438 715/719 |
| 2012/0266197 A1* | 10/2012 | Andrews, II | G06Q 30/02 725/60 |

FOREIGN PATENT DOCUMENTS

| | | |
|---|---|---|
| WO | WO2009/101623 | 8/2009 |
| WO | WO2009/101624 | 8/2009 |

OTHER PUBLICATIONS

Object-Based Interactive Video Access for Consumer-Driven Advertising; Guang-Ho Cha; Department of Computer Engineering, Seoul National University of Technology; Seoul 139-743. South Korea.

\* cited by examiner

VIDEO-ASSOCIATED OBJECTS

CROSS-REFERENCE TO RELATED APPLICATIONS

The present application claims the benefit of U.S. Provisional Application 61/144,477 titled "Multiple components manager", filed Jan. 14, 2009, the contents of which is hereby incorporated by reference herein.

BACKGROUND

The present disclosure relates to enriching video content in general, and to enriching video content using external objects, in particular.

Modern technology enables serving video content to clients over a computerized network, such as the Internet. Additional objects may be introduced to the video in order to improve user experience, value to video owners, such as by serving commercial advertisements, and the like.

PCT Publication number WO2009/101623 titled "INSERTING INTERACTIVE OBJECTS INTO VIDEO CONTENT", which is hereby incorporated by reference, discloses dynamic matching of objects to a video, to increase utility of the inserted object.

PCT Publication number WO2009/101624 titled "APPARATUS AND METHOD FOR MANIPULATING AN OBJECT INSERTED TO VIDEO CONTENT", which is hereby incorporated by reference, discloses dynamic insertion of objects to a video.

Other methods, systems and products to match objects to videos and insert the objects to a video also include static matching, static insertion, utilization of predetermined applications such as object-specific video players, and the like.

BRIEF SUMMARY OF THE INVENTION

One exemplary embodiment of the disclosed subject matter is a computerized system comprising: a media player configured to display a data stream, wherein the media player having a display layout; an event detector configured to identify an event associated with the data stream displayed by the media player; and an object, wherein the object is configured to be displayed in a location, the location is outside the display layout, wherein the object is responsive to the event identified by the event detector.

Optionally, the media player and the object are configured to be executed in a securely separated manner.

Optionally, the media player and the object are configured to be executed by a separate virtual machine.

Optionally, the object is an interactive object.

Optionally, the object is configured to perform a predetermined animation in response to the event.

Optionally, the media player comprising a second object, the second object is configured to perform a second predetermined animation in response to the event; and the computerized system further comprising a coordinating module configured to coordinate the predetermined animation and the second predetermined animation.

Optionally, the media player comprising a second object, the second object is configured to perform a predetermined animation in response to the event.

Optionally, the predetermined animation is based upon the location of the object.

Optionally, the event is selected from the group consisting of an interaction with a second object, a tracking event of an entity in the video, a placement event of an entity in the video, a frame event, a keyword event and an ambient event of the video.

Optionally, the event comprising a frame identification; and a target object identification; wherein the target object identification is associated with the object.

Optionally, the media player and the object are configured to be displayed by a web browser.

Optionally, the media player and the object are configured to be displayed in a web page.

Another exemplary embodiment of the disclosed subject matter is a method for utilizing a video-associated object in a computerized environment, the method comprising: displaying a data stream in a display layout by a media player; identifying an event associated with the data stream; in response to the event, displaying an object in a location, the location is outside the display layout.

Optionally, in response to the event, displaying a second object in the display layout; the displaying the second object comprises performing a predetermined animation.

Optionally, the performing the predetermined animation comprises at least one of the following: playing a media content; displaying an image; displaying an animated image; displaying a message; and modifying a current display to a modified display.

Optionally, the predetermined animation is performed in accordance with a relative position between the display layout and the location.

Optionally, the displaying the object comprises performing a second predetermined animation; wherein the predetermined animation and the second predetermined animation are coordinated.

Optionally, the displaying the data stream and the displaying the object are performed in separated resource environments.

Optionally, the displaying the data stream comprises displaying the data stream in a web page; and the displaying the object comprises displaying the displayable object in the web page.

Yet another exemplary embodiment of the disclosed subject matter is a computer program product comprising: a computer readable medium; a first program instruction for displaying a data stream in a display layout by a media player; a second program instruction for identifying an event associated with the data stream; and a third program instruction for displaying an object in a location in response to the event, the location is outside the display; wherein the first, second and third program instructions are stored on the computer readable medium.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
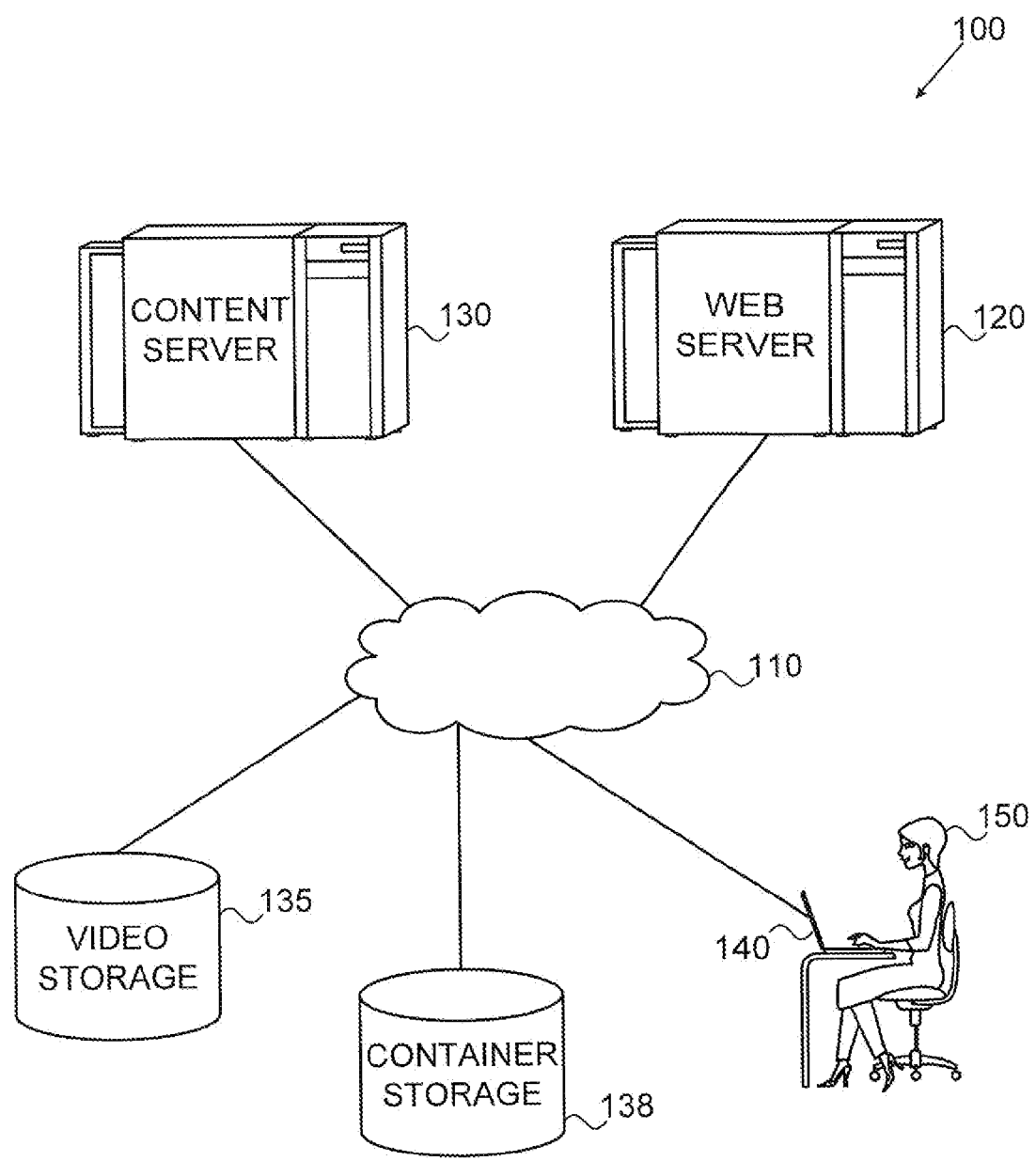
FIG. 1 shows a computerized environment in which the disclosed subject matter is used, in accordance with some exemplary embodiments of the subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to enable an interaction between a video player and an object. The object may be external to the video player. The video player may be enriched, enhanced or otherwise extended with another object, such as an interactive object. The video player and the object may be executed in a securely separated manner, such as in a different sandbox or by a virtual machine.

Another technical problem dealt with by the disclosed subject matter is to provide an infrastructure for such interaction between an object and a video matched on the fly.

Yet another technical problem dealt with by the disclosed subject matter is to coordinate between animation of the object and animation of the video player, such as for example to provide a synchronized animation, a video-context-dependant animation by the object or the like.

One technical solution is to provide an event detector to identify an event associated with the video player or an object presented by the video player. The event detector may dispatch the event to the external object. The external object may be responsive to the event.

Another technical solution is to provide a coordinating module to coordinate predetermined animation associated with the video player, the external object or other components.

Yet another technical solution is to have a predetermined animation associated with an object. The predetermined animation may be parameter-dependant, such as may be modified based on a relative location of the video player and the external object.

One technical effect of utilizing the disclosed subject matter is providing a modified display based on an identification of an event. Another technical effect is achieving synchronized or otherwise coordinated animation between two components, such as the video player and the external object. The components may be executed separately, such as by a virtual machine, and still be coordinated.

Referring now to FIG. 1 showing a computerized environment in which the disclosed subject matter is used, in accordance with some exemplary embodiments of the subject matter. A computerized environment 100 may comprise a computerized network 110. The computerized network 110 may connected one or more computerized clients. The computerized network 110 may be the Internet, an Intranet, a WAN, a LAN, a WiFi-based network, a cellular network, or the like In some exemplary embodiments, a user 150 may utilize a client 140 to consume data stream retrieved from the network 110. In some exemplary embodiments, the data stream may represent a video having a plurality of frames, a video having a soundtrack, an interactive video, or the like. The user 150 may consume the data stream by, for example, viewing the video represented by the data stream. In some exemplary embodiments, the client 140 may be a personal computer, a laptop, a Personal Digital Assistant (PDA), a mobile device, a cellular phone, a smartphone, or the like. The client 140 may comprise a web browser configured to display the data stream retrieved from the network 110.

In some exemplary embodiments, the user 150 may view a web page, such as served by a web server 120. The web server 120 may provide the client 140 the web page including a video player, such as for example, a flash-based video player. The web page may include a video player configured to play a predetermined video, such as selected by a content server 130. The content server 130 may select a video or other content from a video storage 135. The content server 130 may select the content based on user input of the user 150, based on the IP address of the user client 140, based on a history of the user 150 or the client 140, or the like. Other parameters, rules and configurations may apply to the selection of the video from the video storage 135.

In some exemplary embodiments, the web page provided by the web server 120 may comprise additional content, such as objects selected from a container storage 138. The container storage 138 may retain objects, such as interactive objects, displayable objects or the like. Some of the objects may be inserted to a video, such as for example, as a ticker, in a seamless manner, in accordance with a perspective of a frame of the video, or the like. Some of the objects may be displayed outside a video, such as a companion to the video.

There may be many different companion objects. Some companion objects may provide additional information to that detailed in the video. Some companion objects may display an advertisement. Some companion objects may be associated with an object, where the object may be inserted to the video. Some companion objects may be predeterminedly associated with a video. Some companion objects may be predeterminedly associated with another object. Some companion objects may be associated with metadata of a video, such as for example, a keyword, a predetermined frame or the like. Some companion objects may be associated with a video on-the-fly. In some exemplary embodiments, the companion may display additional information in response to an event associated with a video. In some exemplary embodiments, the companion may display additional information in response to an interaction of the user with the video or with an object displayed in the video, such as an object dynamically inserted to the video as an overlay on the video.

Figure 2A:
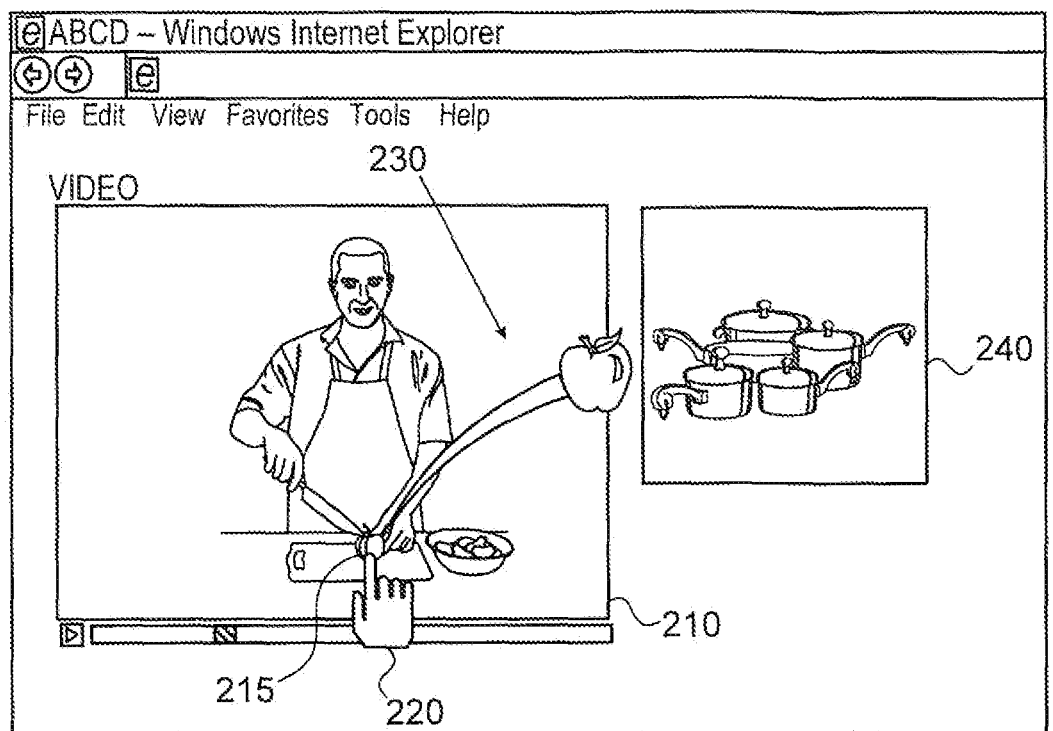
FIGS. 2A and 2B show a web page, in accordance with some exemplary embodiments of the disclosed subject matter.
Figure 2B:
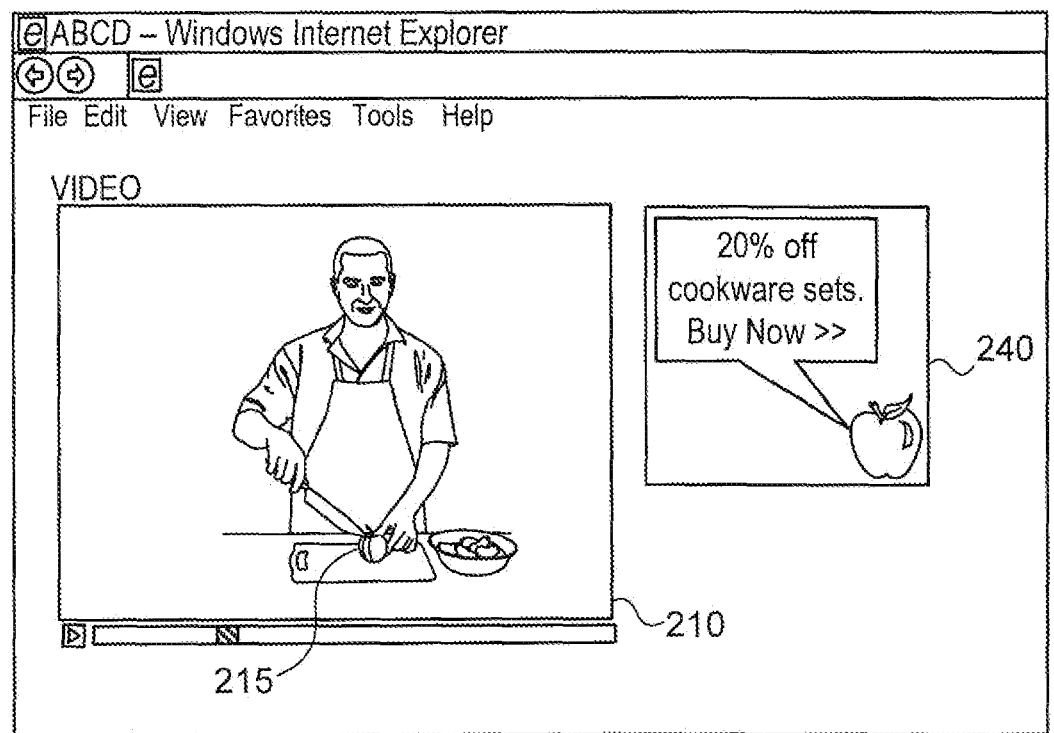

FIGS. 2A and 2B disclose an exemplary usage of the disclosed subject matter. FIGS. 2A and 2B both show a web page, in accordance with some exemplary embodiments of the disclosed subject matter. In some exemplary, embodiments, the web page may be defined by a markup language, such as for example HTML. The web page may be embedded with scripts, applets, programs or the like, as is known in the art. In some exemplary embodiments, the web page may be presented by a web browser, by an email client, by a word processor, or by another program configured to display a page defined by the markup language.

Referring now to FIG. 2A, a web browser 200 may display a web page. The web page may comprise a video player 210 and an object 240. The video player 210 may be a flash-based video player, a proprietary video player, an open-source video player or the like. In some exemplary embodiments, the video player 210 may be a standard video player extended by an extension to provide the functionality in accordance with the disclosed subject matter. The object 240 may be displayed side-by-side to the video player 210, above or below it, or elsewhere. In some exemplary embodiments, the object 240 is displayed in an external position relative to the video player 210. The object 240 may be displayed or may be in an undisplayed state.

In FIG. 2A, the object 240 is displayed and its content is a picture of pans. The pans may be displayed as part of an advertisement. In FIG. 2A, the video player 210 displays a video of a person cooking. The person can be seen cutting an apple. A user, such as 150 of FIG. 1, may utilize a pointing device, such as a computer mouse, a touch screen or the like, to interact with the video, such as by pointing to an object using a cursor 220. The user may interact with an object such as an apple 215. The user may click on the apple 215, hover above it, or otherwise interact with the apple 215. It will be noted that the apple 215 may be an object, such as dynamically inserted object, may be associated with a hot spot, or otherwise defined for the exemplary interaction disclosed in FIG. 2A. It will be noted that a hot spot, as is known in the art, is an area within one or more frames of a media item, such as a video, that enables an interaction by the user. In an exemplary embodiment, a hot spot may be defined as an area of the apple 215 in the video, and upon a user interaction, such as by clicking in the hot spot, an event may be triggered.

In response to the interaction of the user with the apple 215, an animation 230 may be displayed. The animation 230 may be an image of an apple moving from the apple 215 to the object 240. The animation 230 may depend on various parameters, such as location of interaction (e.g., location of the cursor 220), relative position of the object 240 to the video player 210, a frame of the video being displayed in the video player, the object with which the user interacted (e.g., the apple 215), or the like. The animation 230 may comprise an image of an apple similar to the apple 215 animated from the location of the apple 215 to the location of the object 240.

Referring now to FIG. 2B, the web page 200 is displayed after the animation 230 of FIG. 2A has ended. The object 240 may display another animation, an image or the like. The object 240 displays, for example, a commercial associated with the apple 215.

In some exemplary embodiments, the video player 210 may pause the video being displayed in response to an interaction of the user via the cursor 220. In some exemplary embodiments, the video player 210 may resume the video upon predetermined action. In other exemplary embodiments, the video player 210 may continue to show the video while the animation 230 is displayed.

In some exemplary embodiments, there may be an animation associated with the object 240, without any additional animation related to the video, such as the animation 230 of FIG. 2A.

In some exemplary embodiments, the video displayed in the video player 210 may be a pre-roll commercial, such as a video commercial displayed before displaying a requested video. The video may be a post-roll, a video displayed during commercial intermission or the like.

In some exemplary embodiments, the object 240, which may be referred to as a companion object, or a video orbit, may be described by an identification and layout parameters, such as size, position and the like. The object 240 may be responsive to events associated with the identification. For example, in some cases multiple objects similar to the object 240 may be presented, each associated with a different identification. Some events may induce a functionality of some of the multiple objects. The disclosed subject matter may dispatch the event to objects using their identification. In some exemplary embodiments, the event may comprise an identification, which may be used to determine to which objects the event may be dispatched or which objects may be responsive to the event.

Figure 3:
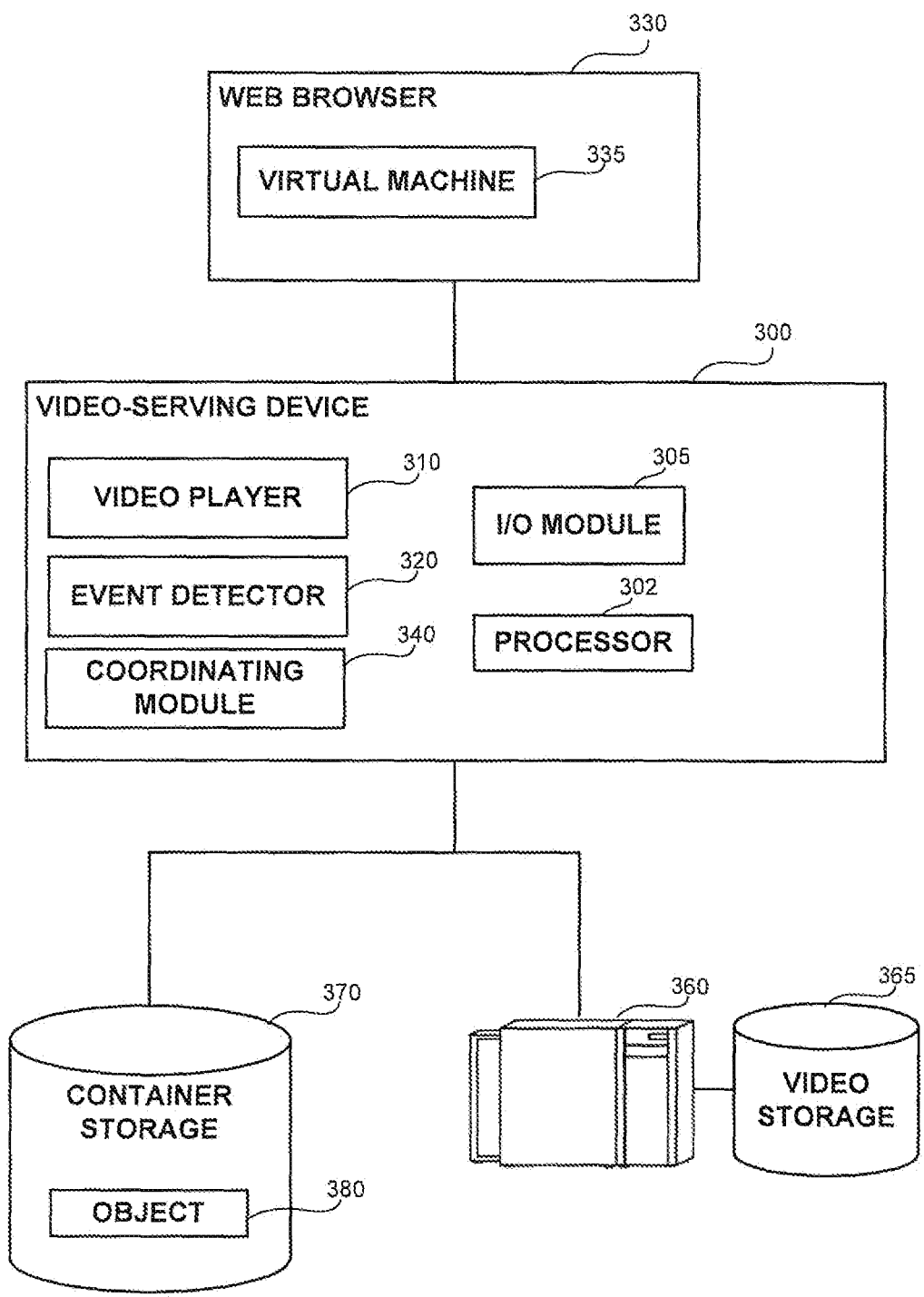
FIG. 3 shows a block diagram of a computerized system, in accordance with some exemplary embodiments of the disclosed subject matter.

Referring now to FIG. 3 showing a block diagram of a computerized system, in accordance with some exemplary embodiments of the disclosed subject matter.

A video-serving device 300, such as comprised by a web server 120 of FIG. 1, may be configured to serve a video to a user, such as 150 of FIG. 1, in accordance with the disclosed subject matter. The video-serving device 300 may comprise a video player 310, an event detector 320, a coordinating module 340, an I/O device 305 or a processor 302.

In some exemplary embodiments, the video-serving device 300 may comprise a processor 302. The processor 302 may be a Central Processing Unit (CPU), a microprocessor, an electronic circuit, an Integrated Circuit (IC) or the like. The processor 302 may be utilized to perform computations required by the video-serving device 300 or any of it subcomponents.

In some exemplary embodiments, the video-serving device 300 may comprise an Input/Output (I/O) module 305.

In some exemplary embodiments, the I/O module 305 may provide an interface to a content server 360, such as 130 of FIG. 1. The content server 360 may provide a video from a video storage 365, such as 135 of FIG. 1. The video storage 365 may be a database, a storage server, or the like.

In some exemplary embodiments, the I/O module 305 may provide an interface to a container storage 370, such as 138 of FIG. 1. The container storage 370 may be a database, a storage server or the like. The container storage 370 may retain objects, such as an object 380. The object 380 may be a displayable object, such as the apple 215 of FIG. 2A or the object 240 of FIG. 2A. The object 380 may be an interactive object. The object 380 may be associated with a predetermined video, a set of videos, a plurality of videos having a common characteristic or the like.

In some exemplary embodiments, the I/O module 305 may provide an interface to a web browser 330. The I/O module 305 may enable serving a web page to a client, such as 140 of FIG. 1 via a network, such as 110 of FIG. 1.

In some exemplary embodiments, the I/O module 305 may comprise a communication device to enable communication over the network.

In some exemplary embodiments, the video player 310 may be configured to play a video. The video may be retrieved by the content server 360. The video player 310 may be configured to play a video on the web browser 330. The video player 310 may, for example, be a downloadable java program, flash video player, applet or the like. The video player 310 may enable the web browser 330 to play a video, in accordance with the disclosed subject matter. The video player 310 may be associated with a display layout, such as a location within a web page when displayed by the web browser 330.

In some exemplary embodiments, the event detector 320 may configured to identify an event associated with the video player 310. The event may be an interactive event, such as a click by a user, a cursor interaction, keyboard stroke or the like. The event may be associated with data stream representative of a video being displayed by the video player 310. The event may be a tracking event based on a determined movement of an object within the video. The event may be a placement event based on determined placement of an entity in the video. The event may be a frame event, such as playing a predetermined frame or set of frames. The event may be a keyword event, such as a keyword is associated with a frame being played. The keyword may be predeterminedly associated with the frame, such as by manual or automatic processing. The keyword may be dynamically determined, such as by face recognition, computerized vision or other machine-implemented algorithms. The event may be an ambient event representative of a change in ambiance in a video, such as determined based on sound, color scheme, manual determination or the like. It will be noted that other event may be utilized. The events may utilize other characteristics of the metadata associated with frames or videos, other types of user inputs and the like.

In some exemplary embodiments, the coordinating module 340 may be configured to coordinate animation of two or more elements. The coordinating module 340 may coordinate animation of an object, such as 240 of FIG. 2A, and the video being played by the video player 310. For example, the coordinating module 340 may synchronize the object such that the object may be animated in accordance with a tempo associated with a soundtrack of the video. The coordinating module 340 may synchronize animation such as 230 of FIG. 2A and of object, such as 240 of FIG. 2B, such that an order between different animation elements may be determined. For example, a predetermined order may induce, that the animation 230 may be first performed, and once the element animated in 230 reaches the object 240 or almost reaches the object 240, the image in object 240 may be modified.

In some exemplary embodiments, the web browser 330 is configured to display a web page in accordance with the disclosed subject matter. The web browser 330 may be a standard web browser, such as for example Microsoft Internet Explorer, Google Chrome, Mozilla FireFox or the like. The web browser 330 may be executed by a client, such as 140 of FIG. 1. The web browser 330 may utilize a virtual machine 335 to provide a separation between executed elements of the web page, such as the video player 310 and the object 380. The separation may be performed as is known in the art. In some exemplary embodiments, the virtual machine 335 may provide a unique sandbox for each applet. The virtual machine 335 may be a virtual machine associated with a predetermined computing language, such as for example Java. Other exemplary embodiments, may utilize different devices to achieve separation.

Figure 4:
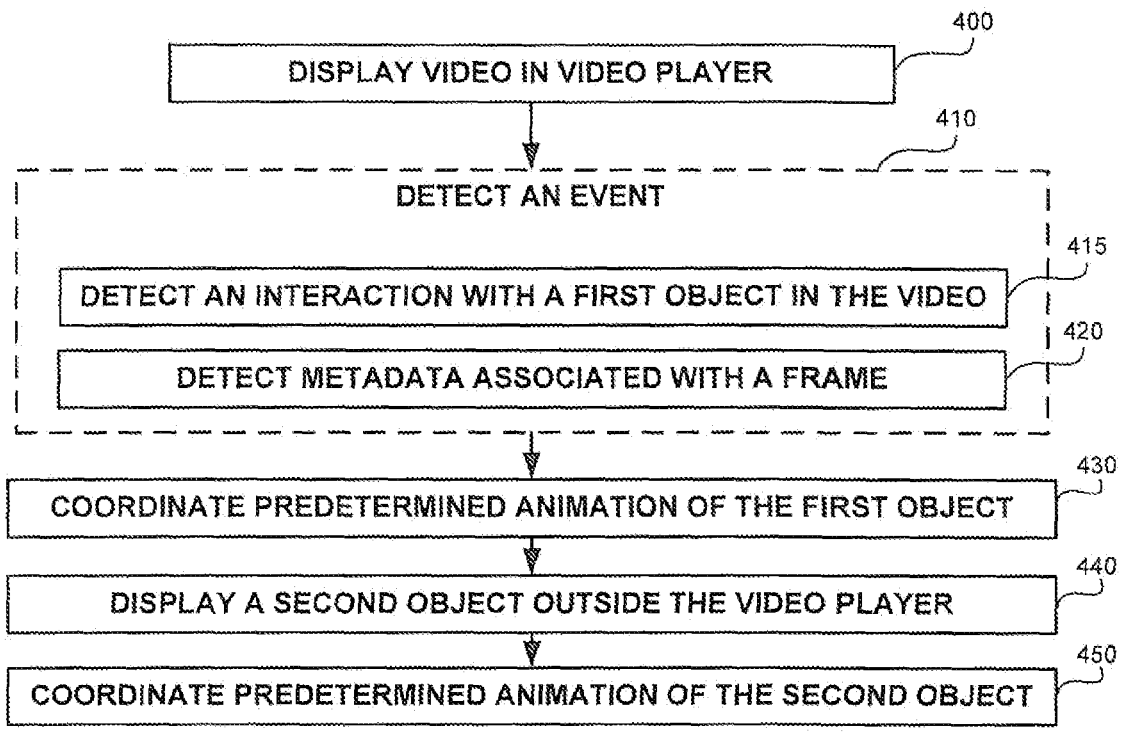
FIG. 4 shows a flowchart diagram of a method, in accordance with some exemplary embodiments of the disclosed subject matter.

Referring now to FIG. 4 showing a flowchart diagram of a method, in accordance with some exemplary embodiments of the disclosed subject matter.

In step 400, a video may be displayed in a video player. The video player may be 310 of FIG. 3. The video player may be displayed in a display layout. The video player may be displayed by a web browser, such as 330 of FIG. 3.

In step 410, an event may be detected. The event may be detected by an event detector 320 of FIG. 3. The step 410 may comprise step 415 of detection of an interaction of a user with a first object. The first object may be inside the video, such as for example an hot spot object above the apple 215 of FIG. 2A. The step 410 may comprise step 420 of detection of metadata associated with a frame of the video being displayed. Other event may be similarly detected.

In step 430, a predetermined animation may be coordinated. The animation may be coordinated by a coordinating module 340 of FIG. 3. The coordination may induce an order of elements with the predetermined animation, between elements from different animations, between elements of animation and frames of the video and the like. In some cases, the coordination may induce a synchronization of the animation.

In step 440, a second object may be displayed outside the display layout of the video player. The second object may be previously displayed, and in response to the event of FIG. 410, the display of the second object may be modified.

In step 450, coordination may be performed in a similar manner to that in step 430.

In some exemplary embodiments, the disclosed subject matter may be utilized to display in the second object information regarding elements displayed in the video. For example, in case the video shows a plurality of products, the object may list each product in response to a pertinent product being displayed in the video. Such an exemplary embodiment may be useful to increase sales. The products may be listed with other relevant information, such as price, weight or the like. The products may be displayed with additional data which may be retrieved from other sources, such as Internet sites.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes or illustration and description, but is not intended to be exhaustive or limited to the invention in the form disclosed. Many modifications and variations will be apparent to those of ordinary skill in the art without departing from the scope and spirit of the to invention. The embodiment was chosen and described in order to best explain the principles of the invention and the practical application, and to enable others of ordinary skill in the art to understand the invention for various embodiments with various modifications as are suited to the particular use contemplated.

We claim:

1. A method comprising:
displaying, in a display device, a web page having a layout, wherein the layout comprising a video frame and an external frame, wherein the video frame comprises a media player configured to display videos, wherein the media player is executed by a virtual machine, wherein the external frame is external to the video frame, wherein the video frame and the external frame are spaced apart by a space, wherein said displaying comprises displaying in the media player a video and an animated interactive object as an overlay over the video that is visible to a viewer of the video without prior interaction therewith, wherein the animated interactive object is a representation of a physical object shown in the video and located in a location corresponding the physical object wherein the animated interactive object is configured to being executed separately and independently from the media player in a separate sandbox, while maintaining synchronization between the animated interactive object and the video displayed by the video media player;
in response to an interaction by a user with the animated interactive object, displaying a graphical animation of a movement of the animated interactive object from the video frame to the external frame and through the space, wherein a direction of the graphical animation is predetermined based on a relative position between the interactive object and the external frame, wherein the layout of the web page remains unchanged throughout said displaying the web page and said displaying the graphical animation of the movement; and
after said displaying the graphical animation of the movement displaying an advertisement in the external frame.

2. The method of claim 1, wherein in response to the interaction, pausing the video displayed in the video frame.

3. The method of claim 1 further comprises:
obtaining the video from a video storage; and
obtaining the animated interactive object from an object storage.

4. The method of claim 3, wherein said obtaining the animated interactive object comprises selecting the animated interactive object from a plurality of objects.

5. The method of claim 1, wherein the graphical animation further comprises coordinated sub-animations in the video frame and in the external frame.

6. The method of claim 1, wherein the graphical animation is modifiable based on a parameter describing a relative position of the external frame with respect to the video frame.

7. The method of claim 1, wherein the external frame is used to display graphical content prior to said displaying the graphical animation.

8. The method of claim 1, wherein the graphical animation is synchronized, at least in part, with a tempo of a soundtrack of the video.

9. A method comprising:
provisioning of an animated interactive object to be displayed as an overlay over a video content that is being displayed to a user viewing a web page having a layout, wherein the layout comprising a video frame and an external frame, wherein the video content is being displayed in the video frame by a media player that is executed by a virtual machine, wherein the external frame is external to the video frame, wherein the video frame and the external frame are spaced apart by a space, wherein the animated interactive object is a representation of a physical object shown in the video content and located in a location corresponding the physical object, wherein the animated interactive object is visible to the user without prior interaction therewith, wherein the animated interactive object is configured for being executed separately and independently from the media player in a separate sandbox, while maintaining synchronization between the animated interactive object and the video content being displayed by the media player;
wherein the animated interactive object is configured to respond to an interaction by the user, wherein in response to a detected interaction, a graphical animation is displayed in the web page, wherein the graphical animation comprises a movement of the animated interactive object from the video frame to the external frame and through the space, wherein a direction of the graphical animation is predetermined based on a relative position between the animated interactive object and the external frame, wherein the layout of the web page remains unchanged throughout said displaying the web page and said displaying the graphical animation of the movement; and
wherein following the display of the graphical animation, an advertisement is displayed in the external frame.

10. The method of claim 9 further comprising: matching the advertisement to the video content and the user, wherein the animated interactive object is selected from a repository in accordance with the advertisement.

11. The method of claim 9 further comprising: matching the advertisement to the video content and the user, wherein the animated interactive object is determined based upon the advertisement.

12. A system comprising a processor and a display device, wherein said processor is configured to perform the steps of:
displaying, in the display device, a web page having a layout, wherein the layout comprising a video frame and an external frame, wherein the video frame comprises a media player configured to display videos, wherein the media player is executed by a virtual machine, wherein the external frame is external to the video frame, wherein the video frame and the external frame are spaced apart by a space, wherein said displaying comprises displaying in the media player a video and an animated interactive object as an overlay over the video visible to a viewer of the video without prior interaction therewith, wherein the animated interactive object is a representation of a physical object shown in the video and located in a location corresponding the physical object, wherein the animated interactive object is configured to be executed separately and independently from the media player in a separate sandbox, while maintaining synchronization between the animated interactive object and the video displayed by the video media player;
in response to an interaction by a user with the animated interactive object, displaying a graphical animation of a movement of the animated interactive object from the video frame to the external frame and through the space, wherein a direction of the graphical animation is predetermined based on a relative position between the animated interactive object and the external frame, wherein the layout of the web page remains unchanged throughout said displaying the web page and said displaying the graphical animation of the movement; and
after said displaying the graphical animation of the movement, displaying an advertisement in the external frame.

13. The system of claim 12, wherein in response to the interaction, said processor is configured to pause the video displayed in the video frame.

14. The system of claim 12, wherein the graphical animation further comprises coordinated sub-animations in the video frame and in the external frame.

15. The method of claim 12, wherein the external frame is used to display graphical content prior to said displaying the graphical animation.

* * * * *